May 28, 1968  I. L. FISCHER  3,386,021

DIRECT CURRENT MOTOR SPEED CONTROL SYSTEM

Filed Aug. 28, 1964

INVENTOR
I. L. FISCHER

BY

United States Patent Office 3,386,021
Patented May 28, 1968

3,386,021
DIRECT CURRENT MOTOR SPEED
CONTROL SYSTEM
Israel L. Fischer, Harrington Park, N.J., assignor to the United States of America as represented by the Secretary of the Air Force
Filed Aug. 28, 1964, Ser. No. 392,977
2 Claims. (Cl. 318—329)

ABSTRACT OF THE DISCLOSURE

A speed control for a direct current motor which compares a pulse wave of repetition frequency $f_o$ proportional to the motor speed with a reference pulse wave of repetition frequency $f_c$ and provides a direct voltage $e$, for controlling the motor speed through control of its field energization, that has a steady maximum value when $f_o < f_c$, a steady minimum value when $f_o > f_c$ and, after either of these values of $e$ has brought $f_o$ into substantial equality with $f_c$, oscillates between the two values to form a rectangular wave of direct voltage that is automatically varied in duty cycle to provide the average value of $e$ required to maintain $f_o$ in exact equality with $f_c$.

---

This invention is concerned primarily with controlling the speed of a direct current motor, but broadly the described control system may be used for accurately controlling any device whose output is or can be converted to a frequency and which may be controlled by a time-averaged direct voltage or by another device that responds to such a voltage. The speed of a motor can easily be converted to a frequency and is directly controlled by the average value of the applied direct driving voltage. An oscillator, whose frequency may be controlled by an applied direct voltage, is another example of a device with which the described control system may be used.

Briefly, the control system compares the output frequency $f_o$ with a control frequency $f_c$ and provides a direct voltage $e$ for controlling $f_o$ that has a steady maximum value when $f_o < f_c$, a steady minimum value when $f_o > f_c$ and, after either of these voltages has brought $f_o$ into substantial equality with $f_c$, oscillates between these two values to form a rectangular wave of direct voltage that is automatically varied in duty cycle to provide the average value required to maintain $f_o$ in exact equality with $f_c$.

Advantages of the system are (1) there is no steady-state error, i.e. after the control system has reached the steady state $f_o = f_c$, (2) the system is completely electronic, (3) no integrators are required, as is usually the case with control systems that yield zero error, (4) the entire system is simple and can be extremely compact, (5) the range of frequency control is extremely broad, and (6) the control system will operate properly with any initial difference between $f_o$ and $f_c$.

Figure 1:
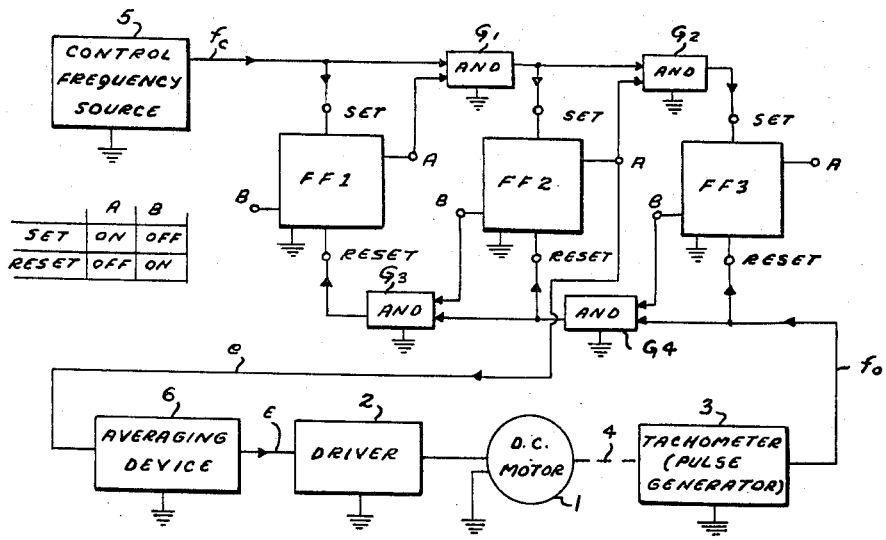
Figure 2:
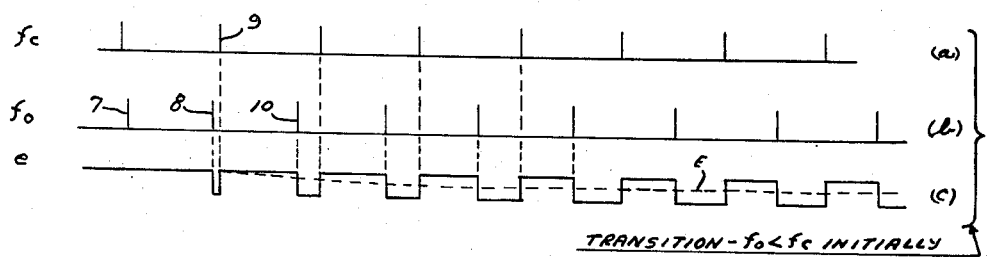
Figure 3:
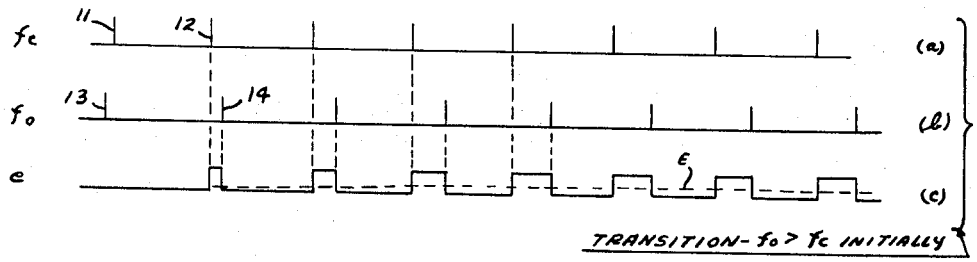

The invention will be described in more detail with reference to the specific embodiment thereof shown in the accompanying drawing in which:

FIG. 1 is a block diagram of the control system as applied to a direct current motor for controlling its speed, and FIGS. 2 and 3 are waveforms explaining the operation of FIG. 1.

Referring to the direct current motor control system of FIG. 1, a direct current motor 1 is supplied with driving voltage from a suitable driving circuit 2 which may be any type of device capable of supplying sufficient direct current power to drive motor 1 under full load conditions at the desired speed and at a voltage that is proportional to the input control voltage E. For example, device 2 may be any suitable type of power amplifier. The speed of motor 1 is converted to a proportional frequency by tachometer or pulse generator 3 coupled to motor shaft 4 which produces a train of pulses of repetition rate proportional to and preferably considerably higher than the rotational frequency of the motor. This pulse train is represented by waveforms (b) in FIGS. 2 and 3. The pulses are preferably sharp trigger pulses as shown. Various methods are known in the art for deriving a pulse train from a rotating shaft such as, for example, cam operated switches, magnetic pickups, optical choppers, etc. Also wave shaping networks for producing sharp trigger pulses are well known in the art. Consequently, it is not necessary to describe in detail the equipment included in block 3 for generating the $f_o$ pulses.

Control frequency source 5 may be of any type supplying a train of sharp trigger pulses having the repetition rate $f_c$. These pulses are illustrated by waveform (a) in FIGS. 2 and 3. Any known apparatus may be used to provide the pulse train $f_c$, for example, block 5 may consist of a crystal controlled oscillator and suitable wave shaping circuits.

The control circuit consists of three bistable circuits or flip-flops FF1, FF2 and FF3 and four AND gates $G_1$, $G_2$, $G_3$ and $G_4$. The bistable circuits are all alike. Each is always in one of two possible stable states designated set and reset. Each has a set input terminal, a reset input terminal and two output terminals A and B. A trigger pulse applied to the set terminal will trigger the circuit to the set state provided it is not already in that state in which case it has no effect on the circuit. Similarly, a trigger applied to the reset terminal will trigger the circuit to the reset state if not already in that state. In the set state output terminal A is "on" and output terminal B is "off," whereas, in the reset state, terminal B is "on" and terminal A is "off." In the system shown, "on" means a steady positive voltage and "off" means zero voltage or a positive voltage of considerably less magnitude than the "on" voltage. Various bistable circuits are known in the art which satisfy the above requirements and any may be used. An example is the Eccles-Jordan circuit or its transistorized counterpart. The AND gates $G_1$–$G_4$ are all alike and any of the known types may be used. As well understood in the art, an AND gate is a circuit in which an output is produced only when all of its inputs, in this case two, are simultaneously energized.

The control circuit receives the pulse waves $f_c$ and $f_o$ and produces at terminal A of FF2 a direct control voltage $e$ that is applied to averaging device 6 for deriving its average value E. The average value is in turn applied to driver 2 for controlling the speed of motor 1. When the motor speed is low ($f_o < f_c$) and the control circuit is operating to raise the speed, $e$ has a steady maximum value which, as will be seen later, must be high enough to raise $f_o$ slightly above $f_c$ with maximum motor load. When the motor speed is high ($f_o > f_c$) and the control circuit is operating to lower the speed, $e$ has a steady minimum value which may be zero but must be low enough for $f_o$ to fall slightly below $f_c$ with minimum motor load. The maximum and minimum steady values of $e$ represent transient states of the control circuit in which $f_o$ is being brought into substantial equality with $f_c$. When, in either of the transient states, $f_o$ has reached $f_c$ and gone slightly past it to a value slightly greater than $f_c$, if initially less than $f_c$, or a value slightly less than $f_c$, if initially greater than $f_c$, there is a transition in the control circuit to its steady state in which $e$ oscillates between its maximum and minimum values to produce a rectangular wave the duty cycle of which is automatically adjusted to provide a rectangular wave of the proper average value for the condition $f_o = f_c$. Any tendency, in the steady state of the circuit, for $f_o$ to drift away from $f_c$ in either direction automatically changes the duty cycle of the rectangular wave in such direction as to oppose the change. The detailed manner in which the control circuit operates is as follows:

Transient state—$f_o < f_c$ initially

When $f_o < f_c$ the control circuit sooner or later adjusts itself to a condition in which FF2 is set and FF3 is alternately set and reset by the $f_c$ and $f_o$ pulses. This is true regardless of the states of the three flip-flops and regardless of the difference by which $f_o$ is less than $f_c$ when the system is initially energized. With FF2 set, terminal A is "on" and $e$ has its maximum steady value causing the speed of motor 1 to increase.

The process by which the control circuit reaches the above described condition may be explained by assuming initial states for the three flip-flops. Assume, for example, that all three are in the reset state and that the first pulse to occur is an $f_c$ pulse. The first $f_c$ pulse sets FF1. Assume the next pulse to occur is an $f_o$ pulse. This pulse passes through $G_4$ and $G_3$, since FF3 and FF2 are in their reset states, and resets FF1. If the frequency difference between $f_c$ and $f_o$ is not too great and if they are initially about a half period apart in phase, alternation between $f_c$ and $f_o$ pulses and set and reset states of FF1 may continue for a number of cycles, but, with $f_c$ and $f_o$ different, the phase relation between the two pulse trains is continually changing and eventually, with $f_o < f_c$, two $f_c$ pulses will occur in the same $f_o$ pulse interval. When this occurs, the first $f_c$ pulse sets FF1 and the second passes through $G_1$, since FF1 is set and therefore $G_1$ is open, to set FF2, $G_2$ being closed because of the previously reset state of FF2. With $G_3$ closed because of the set state of FF2, the next $f_o$ pulse passes $G_4$ and resets FF2. FF2 may now be alternated between set and reset conditions by alternate $f_c$ and $f_o$ pulses in the same manner as FF1 until eventually two $f_c$ pulses occur in the same $f_o$ pulse interval. When this occurs, the first pulse sets FF2 and the second passes through $G_2$ to set FF3. FF3 now continues to be alternately set and reset for as long as $f_o < f_c$, it being immaterial how many $f_c$ pulses occur in any one $f_o$ pulse interval since those after the first have no influence on the already set FF3. During this time FF2 is in its set state and $e$ has its maximum value causing the speed of motor 1 to accelerate and $f_o$ to increase.

Transition from transient state to steady state—$f_o < f_c$ initially

With the motor speed increasing in the above described transient state, $f_o$ eventually becomes equal to $f_c$ and then greater than $f_c$. Sooner or later after this, depending upon the phase difference between the two pulse waves when $f_o$ becomes equal to $f_c$, two $f_o$ pulses will occur in the same $f_c$ pulse interval. This is illustrated by pulses 7 and 8 in FIG. 2. When this occurs, the first pulse 7 of this pair resets FF3 and the second, pulse 8, passes through $G_4$ to reset FF2, dropping $e$ to its minimium value, as seen in FIG. 2. The next $f_c$ pulse 9 sets FF2, returning $e$ to its maximum value, and the next $f_o$ pulse 10 resets it dropping $e$ again to its minimum value. From then on, alternate $f_c$ and $f_o$ pulses set and reset FF2 producing the rectangular wave shown. It will be noted that with the $f_o$ pulse interval less than the $f_c$ interval ($f_o > f_c$) the ratio of the maximum $e$ interval to the minimum $e$ interval in each cycle of the rectangular wave decreases, or in other words, the duty cycle of the wave decreases. This lowers the average value E of the rectangular wave which reduces the driving energy applied to the motor and eventually lowers $f_o$ toward equality with $f_c$. This causes the $f_o$ pulse interval to lengthen and finally become equal to the $f_c$ pulse interval ($f_o = f_c$). When this occurs, the phase difference between the two pulse trains becomes constant and no further change in duty cycle occurs, the average value E of the wave at this time being that required to drive the motor at the speed for which $f_o = f_c$.

Transient state—$f_o > f_c$ initially

The transient operation of the control circuit when $f_o$ is initially higher than $f_c$ is fundamentally the same as that described above for the condition of $f_o < f_c$ initially. It will be noted that the circuit comprising AND gates $G_4$ and $G_3$ and associated with the RESET and B terminals of FF3, FF2 and FF1 is the same, travelling from right to left in FIG. 2, as the circuit comprising $G_1$ and $G_2$ and associated with the SET and A terminals of FF1, FF2 and FF3, travelling left to right. Therefore, regardless of the amount by which $f_o$ is greater than $f_c$ initially and regardless of the initial states of the three bistable circuits FF1, FF2 and FF3, the control circuit sooner or later adjusts itself to the condition in which FF2 is in its reset state and FF1 is alternately reset and set by the $f_o$ and $f_c$ pulses. The process by which the control circuit reaches this state is fundamentally the same as that described above for the transient state when $f_o < f_c$ initially.

With FF2 in its reset state, terminal A is off and $e$ is held constant at its minimum value. The motor speed therefore decreases lowering $f_o$ toward equality with $f_c$.

Transition from transient state to steady state—$f_o > f_c$ initially

With the motor speed decreasing in the transient state as described above, eventually $f_o$ becomes equal to $f_c$ and then less than $f_c$. As in the previously described transition, sooner or later after $f_o$ has become less than $f_c$, depending upon the phase difference between the two pulse trains when $f_o$ became equal to $f_c$, two $f_c$ pulses will occur in the same $f_o$ pulse interval. This is illustrated in FIG. 3 by $f_c$ pulses 11 and 12 which occur in the interval between $f_o$ pulses 13 and 14. When this occurs, the first $f_c$ pulse 11 sets FF1 and the second $f_c$ pulse 12 passes through $G_1$ and sets FF2, raising $e$ to its maximum value as seen in waveform (c) of FIG. 3. The next $f_c$ pulse 14 resets FF2 returning $e$ to its minimum value, and from then on alternate $f_c$ and $f_o$ pulses set and reset FF2 producing the rectangular waveform shown. It will be noted that with the $f_o$ pulse interval greater than the $f_c$ interval ($f_o < f_c$) the ratio of the maximum $e$ interval to the minimum $e$ interval in each cycle of the rectangular wave increases, or, in other words, the duty cycle increases. This raises the average value E of the rectangular wave which increases the energization of the motor and eventually raises $f_o$ toward equality with $f_c$. This causes the $f_o$ pulse interval to shorten and finally become equal to the $f_c$ pulse interval ($f_o = f_c$). When equality is reached, the phase difference between the two pulse trains becomes constant and no further change in duty cycle occurs, the average value E at this time being that required to drive the motor at the speed for which $f_o = f_c$.

Steady state operation

In its steady state, the control circuit can hold the speed of motor 1 constant ($f_o = f_c$) over a very wide range of loads. As stated above, the energization of the motor depends upon the average value E of the rectangular wave which in turn depends upon the duty cycle of the wave. As may be seen from FIGS. 2 and 3, the duty cycle of the stabilized rectangular wave depends entirely upon the phase difference between the two pulse trains, and may vary from slightly more than zero (E slightly greater than the minimum value of $e$) when the $f_o$ pulses occur very shortly after the $f_c$ pulses to slightly less than unity (E slightly less than the maximum value of $e$) when the $f_o$ pulses trail the $f_c$ pulses by an interval slightly less than the $f_c$ pulse interval. It will be apparent from FIGS. 2 and 3 that a temporary change in the $f_o$ pulse interval away from equality with the $f_c$ pulse interval will produce a change in the phase relation of the two pulse trains and thereby change the rectangular wave duty cycle. It will be further apparent that the change in duty cycle is in the proper direction to oppose the change in the $f_o$ pulse interval. For example, a lowering of $f_o$ and consequent lengthening of the $f_o$ pulse interval will cause the $f_o$ pulses to occur later relative to the $f_c$ pulses and increase the duty cycle. This increases the motor energization which opposes the decrease in $f_o$ and the increase in $f_o$ pulse interval. Thus, a change in motor load causes a temporary change in the $f_o$ pulse interval which brings about the phase change necessary to stabilize the duty cycle at the value required to hold $f_o = f_c$ under the new load condition. Similarly, a tendency for the motor speed to change for any other cause, such as a voltage change in the power supply for driver 2, results in a new phase relation between the pulse trains and a new duty cycle as required to hold $f_o = f_c$.

While the system has been described as used to hold the speed of a motor constant, it could also be used to vary the motor speed by varying $f_c$. Further, by making $f_c$ proportional to a shaft speed in the same manner that $f_o$ is made proportional to a shaft speed, the two shaft speeds may be held the same or in any desired ratio, the latter by providing the proper ratios between $f_c$ and $f_o$ and the rotational speeds of their respective shafts. In short, any quantity for which the repetition frequency of a pulse train may be made the analog and which can be controlled by the average value of a direct control voltage is susceptible to control by the described system.

I claim:

1. A direct current motor speed control system comprising: means providing a control pulse train for repetition frequency $f_c$; means driven by said motor for producing an output pulse train of repetition frequency $f_o$ proportional to the speed of said motor; first, second and third bistable circuits each having a set input terminal, a reset input terminal, an A output terminal and a B output terminal, and each in its set state producing a relatively high direct voltage at its A terminal and a relatively low direct voltage at its B terminal and in its reset state producing a relatively low direct voltage at its A terminal and a relatively high direct voltage at its B terminal; first, second, third and fourth AND gates each having two input circuits and an output circuit; means for applying said $f_c$ pulses to the set terminal of said first bistable circuit and to one input of said first gate; means for applying said $f_o$ pulses to the reset terminal of said third bistable circuit and to one input of said fourth gate; means connecting the A terminal of said first bistable circuit to the other input of said first gate, means connecting the output of said first gate to the set terminal of said second bistable circuit and to one input of said second gate, means connecting the A terminal of said second bistable circuit to the other input of said second gate, means connecting the output of said second gate to the set terminal of said third bistable circuit, means connecting the B terminal of said third bistable circuit to the other input of said fourth gate, means connecting the output of said fourth gate to the reset terminal of said second bistable circuit and to one of the inputs of said third gate, means connecting the B terminal of said second bistable circuit to the other input of said third gate, and means connecting the output of said third gate to the reset terminal of said first bistable circuit; and means coupled to the A terminal of said second bistable circuit and to said motor for applying a direct driving voltage to said motor that is proportional to the average value of the direct voltage at said A terminal.

2. Apparatus for bringing the repetition frequency $f_o$ of a pulse train generated by a pulse train generator the frequency of which is controllable by an applied direct control voltage into equality with the repetition frequency $f_c$ of a train of control pulses and maintaining said equality, said apparatus comprising: first, second and third bistable circuits each having a set input terminal, a reset input terminal, an A output terminal and a B output terminal, and each in its set state producing a relatively high direct voltage at its A terminal and a relatively low direct voltage at its B terminal and in its reset state producing a relatively low direct voltage at its A terminal and a relatively high direct voltage at its B terminal; first, second, third and fourth AND gates each having two input circuits and an output circuit; means for applying said $f_c$ pulses to the set terminal of said first bistable circuit and to one input of said first gate; means for applying said $f_o$ pulses to the reset terminal of said third bistable circuit and to one input of said fourth gate; means connecting the A terminal of said first bistable circuit to the other input of said first gate, means connecting the output of said first gate to the set terminal of said second bistable circuit and to one input of said second gate, means connecting the A terminal of said second bistable circuit to the other input of said second gate, means connecting the output of said second gate to the set terminal of said third bistable circuit, means connecting the B terminal of said third bistable circuit to the other input of said fourth gate, means connecting the output of said fourth gate to the reset terminal of said second bisable circuit and to one of the inputs of said third gate, means connecting the B terminal of said second bistable circuit to the other input of said third gate, and means connecting the output of said third gate to the reset terminal of said first bistable circuit; and means coupled to the A terminal of said second bistable circuit and to said pulse train generator for applying a direct control voltage to said generator that is proportional to the average value of the direct voltage at said A terminal.

References Cited

UNITED STATES PATENTS

| | | | |
|---|---|---|---|
| 3,154,730 | 10/1964 | Houldin et al. | 318—329 X |
| 3,196,421 | 7/1965 | Grace et al. | 318—309 X |

ORIS L. RADER, *Primary Examiner.*

J. J. BAKER, *Assistant Examiner.*